(12) United States Patent
Kita

(10) Patent No.: US 12,353,310 B2
(45) Date of Patent: Jul. 8, 2025

(54) DEVICE CONTROL SYSTEM AND METHOD FOR CONTROLLING DEVICE

(71) Applicant: DAIKIN INDUSTRIES, LTD., Osaka (JP)

(72) Inventor: Kenji Kita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 877 days.

(21) Appl. No.: 17/615,794

(22) PCT Filed: Jun. 5, 2020

(86) PCT No.: PCT/JP2020/022349
§ 371 (c)(1),
(2) Date: Dec. 1, 2021

(87) PCT Pub. No.: WO2020/246594
PCT Pub. Date: Dec. 10, 2020

(65) Prior Publication Data
US 2022/0245041 A1    Aug. 4, 2022

(30) Foreign Application Priority Data

Jun. 7, 2019 (JP) ................. 2019-106716

(51) Int. Cl.
*G06F 11/30* (2006.01)
*G06F 11/32* (2006.01)

(52) U.S. Cl.
CPC ...... *G06F 11/3024* (2013.01); *G06F 11/3006* (2013.01); *G06F 11/3037* (2013.01); *G06F 11/3075* (2013.01); *G06F 11/328* (2013.01)

(58) Field of Classification Search
USPC ............................................. 700/9
See application file for complete search history.

(56) References Cited

U.S. PATENT DOCUMENTS

| 2006/0187857 A1* | 8/2006 | Imai | ............... H04N 21/4135 370/254 |
| 2017/0187809 A1* | 6/2017 | Chen | ............... H04L 12/6418 |

(Continued)

FOREIGN PATENT DOCUMENTS

| CN | 101523909 A | * | 9/2009 |
| CN | 109274770 A | | 1/2019 |

(Continued)

OTHER PUBLICATIONS

International Search Report of corresponding PCT Application No. PCT/JP2020/022349 dated Sep. 8, 2020.

(Continued)

*Primary Examiner* — Hien D Khuu
(74) *Attorney, Agent, or Firm* — GLOBAL IP COUNSELORS, LLP

(57) ABSTRACT

A device control system remotely controls one or more devices. The device control system includes the one or more devices, and a management apparatus connected to the one or more devices via a network. The management apparatus is capable of executing, in a plurality of execution modes having different processing performances, a program in order to control the one or more devices. The management apparatus accepts input of the program, executes the accepted program in a first execution mode, which is one of the plurality of execution modes, and determines, based on an execution result, an execution mode in which the program is to be executed.

13 Claims, 7 Drawing Sheets

(56) References Cited

U.S. PATENT DOCUMENTS

| | | |
|---|---|---|
| 2019/0041830 A1 | 2/2019 | Yarvis et al. |
| 2020/0112453 A1* | 4/2020 | Brown .............. G06F 16/24573 |
| 2020/0228366 A1* | 7/2020 | Çakir et al. ......... H04L 12/2827 |
| 2021/0278813 A1* | 9/2021 | Ishikawa .............. G05B 19/042 |

FOREIGN PATENT DOCUMENTS

| | | | |
|---|---|---|---|
| GB | 2 443 307 A | | 4/2008 |
| JP | 2003-83596 A | | 3/2003 |
| JP | 2008-107944 A | | 5/2008 |
| JP | 2009-110300 A | | 5/2009 |
| JP | 2014186663 A | * | 10/2014 |
| JP | 2016080472 A | * | 5/2016 |
| JP | 2016-177559 A | | 10/2016 |
| JP | 2019-8736 A | | 1/2019 |
| JP | 2019032686 A | * | 2/2019 |
| JP | 2019086956 A | * | 6/2019 |
| KR | 20140078400 A | * | 6/2014 |
| WO | WO-2005083574 A1 | * | 9/2005 |
| WO | WO-2012120654 A1 | * | 7/2014 |

OTHER PUBLICATIONS

International Preliminary Report of corresponding PCT Application No. PCT/JP2020/022349 dated Dec. 16, 2021.
European Search Report of corresponding EP Application No. 20 818 475.4 dated May 30, 2022.

* cited by examiner

```
DETERMINED EXECUTION MODE:
FIRST EXECUTION MODE
            COST: XX YEN/MONTH

CONTROL QUALITY INFORMATION:

EXECUTION TIME: 4 SECONDS
  (EXECUTION CONDITION: 5 SECONDS)
        PROCESSING TIME OF MANAGEMENT
        APPARATUS: 2.5 SECONDS
        RESPONSE TIME OF DEVICE:
        1.5 SECONDS
    CPU AVERAGE USAGE RATE: XX%
```

FIG. 5

```
DETERMINED EXECUTION MODE:
THIRD EXECUTION MODE
            COST: XX YEN/MONTH

CONTROL QUALITY INFORMATION:

EXECUTION TIME: 4.5 SECONDS
  (EXECUTION CONDITION: 5 SECONDS)
        PROCESSING TIME OF MANAGEMENT
        APPARATUS: 3.0 SECONDS
        RESPONSE TIME OF DEVICE:
        1.5 SECONDS
    CPU AVERAGE USAGE RATE: XX%
```

FIG. 6

DEVICE CONTROL SYSTEM AND METHOD FOR CONTROLLING DEVICE

CROSS-REFERENCE TO RELATED APPLICATIONS

This U.S. National stage application claims priority under 35 U.S.C. § 119 (a) to Japanese Patent Application No. 2019-106716, filed in Japan on Jun. 7, 2019, the entire contents of which are hereby incorporated herein by reference.

BACKGROUND

Field of the Invention

The present disclosure relates to a system for remotely controlling a device and a method for remotely controlling a device.

Background Information

There has been known a network control apparatus that controls an information household electric appliance from a server via a network. Regarding such a network control apparatus, Japanese Unexamined Patent Application Publication No. 2009-110300 provides a network control apparatus capable of easily performing a control setting without performing a control setting of a device for individual manufacturers.

SUMMARY

When a user inputs a control program to a system for remotely controlling a device, it is difficult for the user to input an execution environment parameter required for executing the program if the user is not familiar with the program.

A device control system according to a first aspect remotely controls one or more devices. The device control system includes the one or more devices and a management apparatus. The management apparatus is connected to the one or more devices via a network. The management apparatus is capable of executing, in a plurality of execution modes having different processing performances, a program for controlling the one or more devices. The management apparatus accepts input of the program, and executes the accepted program in a first execution mode. The first execution mode is one of the plurality of execution modes. The management apparatus determines, on the basis of an execution result, an execution mode in which the program is to be executed.

The device control system according to the first aspect determines an execution mode on the basis of a result of executing the program for controlling the one or more devices in the first execution mode, and is thus capable of executing the program for controlling the one or more devices in an appropriate execution mode.

A device control system according to a second aspect is the system according to the first aspect, in which the management apparatus includes a CPU and a storage unit. The management apparatus registers the accepted program and the determined execution mode in the storage unit. The management apparatus executes the program registered in the storage unit in the registered execution mode to control the one or more devices.

In the device control system according to the second aspect, the management apparatus registers not the execution mode used at the execution but the execution mode determined through the execution in the storage unit. The management apparatus executes the program in the registered execution mode.

A device control system according to a third aspect is the system according to the first aspect or the second aspect, in which the management apparatus accepts input of an execution condition of the program when accepting the input of the program. The management apparatus decides to execute the program in a second execution mode when determining that the execution result of the program does not satisfy the execution condition. The second execution mode has a higher processing performance than the first execution mode.

In the device control system according to the third aspect an execution result is determined on the basis of an execution condition of the program input in advance, and thus the execution condition of the program can be determined more appropriately.

A device control system according to a fourth aspect is the system according to any one of the first aspect to the third aspect, in which an execution time of the program is a sum of a processing time of the management apparatus and a response time of the one or more devices connected via the network.

A device control system according to a fifth aspect is the system according to any one of the first aspect to the fourth aspect, in which the system presents to a user, after the execution in the first execution mode, the execution mode of the program, and cost or/and control quality information. The execution mode of the program is an execution mode determined by the management apparatus after the execution in the first execution mode. The cost is the cost when the program is executed in the determined execution mode.

A device control system according to a sixth aspect is the system according to the fifth aspect, in which the control quality information includes an execution time of the program.

A device control system according to a seventh aspect is the system according to any one of the first aspect to the sixth aspect, in which an execution time of the execution of the program in the first execution mode is a sum of a processing time of the management apparatus and a response time of the one or more devices connected via the network. The system gives a warning to a user if the response time of the one or more devices exceeds a predetermined value.

A device control system according to an eighth aspect is the system according to the second aspect, in which the CPU includes a core and a memory. The processing performance of each of the plurality of execution modes includes an operating frequency of the CPU, the number of cores of the CPU, and the number of memories of the CPU.

A device control system according to a ninth aspect is the system according to any one of the first aspect to the eighth aspect, in which the system further includes a control apparatus. The control apparatus is connected to the one or more devices. The control apparatus is connected to the management apparatus via the network. The one or more devices are controlled via the control apparatus.

In the device control system according to the ninth aspect, a plurality of devices can be connected to the control apparatus. Thus, communication between the plurality of devices and the management apparatus is centralized, and the management apparatus is capable of collectively control the devices. The centralized communication enables communication cost to be reduced.

A method for controlling a device according to a tenth aspect is a method for controlling a device executed by a management apparatus. The management apparatus is connected to the device via a network. The management apparatus is capable of executing, in a plurality of execution modes having different processing performances, a program for controlling the device. The management apparatus accepts input of the program in at least one execution mode of the plurality of execution modes. The management apparatus executes the accepted program in the accepted execution mode. The management apparatus determines, on the basis of an execution result, one execution mode in which the program is to be executed among the plurality of execution modes. The management apparatus executes the accepted program in the determined execution mode to control the device.

The method for controlling a device according to the tenth aspect determines an execution mode on the basis of a result of executing a program for controlling a device in an accepted execution mode, and is thus capable of executing the program for controlling a device in an appropriate execution mode.

BRIEF DESCRIPTION OF THE DRAWINGS

FIG. 5 illustrates a display example of a screen presented to a user in the method for controlling a device of the second embodiment.

FIG. 6 illustrates a display example of a screen presented to a user in a method for controlling a device of Modification Example 2B.

DETAILED DESCRIPTION OF EMBODIMENT(S)

First Embodiment (1) Overall Configuration of Device Control System 1

Figure 1:
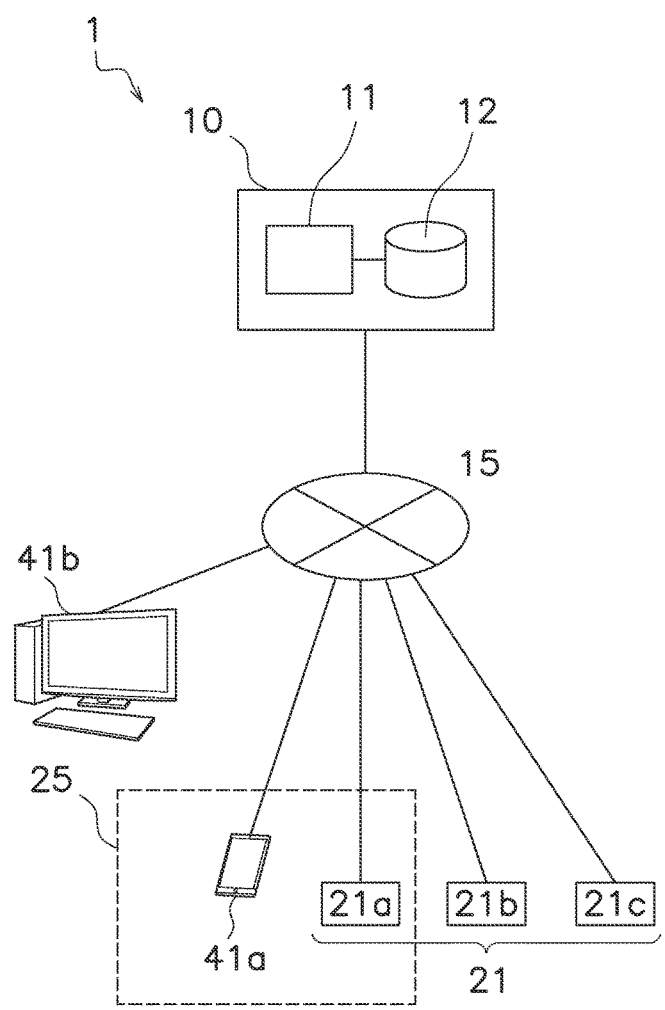
FIG. 1 is a diagram illustrating an overall configuration of a device control system 1 of a first embodiment.

A device control system 1 of the present embodiment includes a device 21, a management apparatus 10, and user terminals 41a and 41b, as illustrated in FIG. 1. The device 21 is installed in a building. The device 21 is, for example, an air conditioning apparatus. The management apparatus 10 is connected to the device 21 and the user terminals 41a and 41b via a network 15. The management apparatus 10 is capable of controlling the device 21 via the network. The user terminals 41a and 41b are interfaces between users and the system 1.

In the device control system 1 of the present embodiment, the management apparatus 10 controls the device 21 by remote operation.

(2) Description of Elements of Device Control System 1

(2-1) Device 21

The device 21 is a device installed in a building. The building is not limited to the inside of the building, and includes the roof of the building, the surroundings of the building, and the like. The building is not limited and may be a commercial building, a residential apartment, a condominium, a public building, a stand-alone house, or the like.

Examples of the device 21 include an air conditioning apparatus, an illumination device, and a ventilation fan. As an air conditioning apparatus, an outdoor unit and a plurality of indoor units connected to the outdoor unit may be handled as a single device, or the outdoor unit and each indoor unit may be regarded as individual devices.

In the present embodiment, it is assumed that the device 21 includes air conditioning apparatuses 21a to 21c for household use. The air conditioning apparatus 21a is disposed in a room 25 of an apartment. A user is present in the room 25 and carries the user terminal 41a. Here, a user includes not only a direct user of the device 21 but also a person who manages facilities of the apartment and a manager who provides a service such as maintenance or energy saving of the device 21. It is assumed that the manager uses the user terminal 41b.

In association with the device 21, there are various pieces of device-related information, in other words, device data. The device data is data about the each device 21, a sensor disposed inside or outside a room, or the like. The device data is transmitted to the management apparatus 10 via the network 15 and is used to control the device 21.

(2-2) User Terminals 41a and 41b

The user terminals 41a and 41b have a role of a user interface.

The user terminals 41a and 41b are connected to the management apparatus 10 via the network 15. The user terminals 41a and 41b exchange information with the management apparatus 10.

The user terminals 41a and 41b are computers. The user terminals 41a and 41b are personal computer, mobile terminals, or the like. The each user terminal 41a and 41b includes a CPU, a memory, an input unit, and a display unit. The user terminals 41a and 41b may be dedicated terminals for the management apparatus 10 or may have other functions. In the present embodiment, the user terminals 41a and 41b are general-purpose mobile terminals, especially smartphones.

A user (a direct user or a manager of the device 21) inputs a control instruction for controlling the device 21 to the user terminal 41a or 41b. The control instruction may be input in both the user terminals 41a and 41b, or may be inputtable in only one of them. Here, the manager of the device inputs the control instruction for controlling the device 21 to the user terminal 41b.

(2-3) Management Apparatus 10

The management apparatus 10 includes a CPU 11, a storage unit 12, and other circuits. The CPU 11 performs various processes, such as computation, storage or registration in the storage unit, reception or transmission of data or a program, and a trial or execution of a program, in cooperation with the storage unit 12 and the other circuits. In this specification, execution until the management apparatus determines an execution mode may be referred to as a trial. The management apparatus 10 may be a virtual apparatus. The CPU 11 includes a core and a memory.

The management apparatus 10 may be provided by a cloud service provider different from a management service provider of the present disclosure. The cloud service provider may provide only an infrastructure. The infrastructure includes hardware. The cloud service provider may provide a platform in addition to the infrastructure. The platform includes an operation system.

The management apparatus 10 is connected to the device 21 and the user terminals 41a and 41b via the network 15. A line that connects the management apparatus 10 and the user terminals 41a and 41b may be a private line or may be a public line. The private line may be a virtual private network (VPN). The line may be provided by the cloud service provider.

The management apparatus 10 acquires device data from the device 21 or the like. The device data is used to control the device as appropriate.

The management apparatus 10 executes a program for controlling the device 21. Specifically, when the management apparatus executes the device control program, a control instruction for the device 21 is transmitted to the device 21 via the network. A control unit of the device 21 controls individual units of the device 21 on the basis of the received control instruction. For example, when the device 21 is the air conditioning apparatus 21a, the inclination of a flap of the air conditioning apparatus 21a is changed on the basis of a control instruction to change the air direction of an indoor fan.

The management apparatus 10 provides an environment in which a user creates a program for controlling the device 21. More specifically, the management apparatus 10 provides an application programming interface (API) for registering a script created by the user. The user inputs, in the user terminal 41a or 41b, a script for controlling the device 21.

The management apparatus 10 has a plurality of execution modes having different processing performances for executing a program for controlling the device 21. Here, a processing performance includes the operating frequency, the number of cores, the number of memories, and so forth of the CPU 11. For example, in the case of executing a program in the management apparatus 10, a first execution mode is implemented with one core and a memory of 512 MB of the CPU, whereas a second execution mode is implemented with two cores and a memory of 2048 MB of the CPU.

In response to the user's input of a program (script) for controlling the device 21, the management apparatus 10 accepts the script. The management apparatus 10 further registers the script and stores the script in the storage unit 12. The management apparatus 10 reads out the registered script from the storage unit 12, selects one execution mode, and executes the program for performing control.

(3) Control of Device by Device Control System 1

Figure 3:
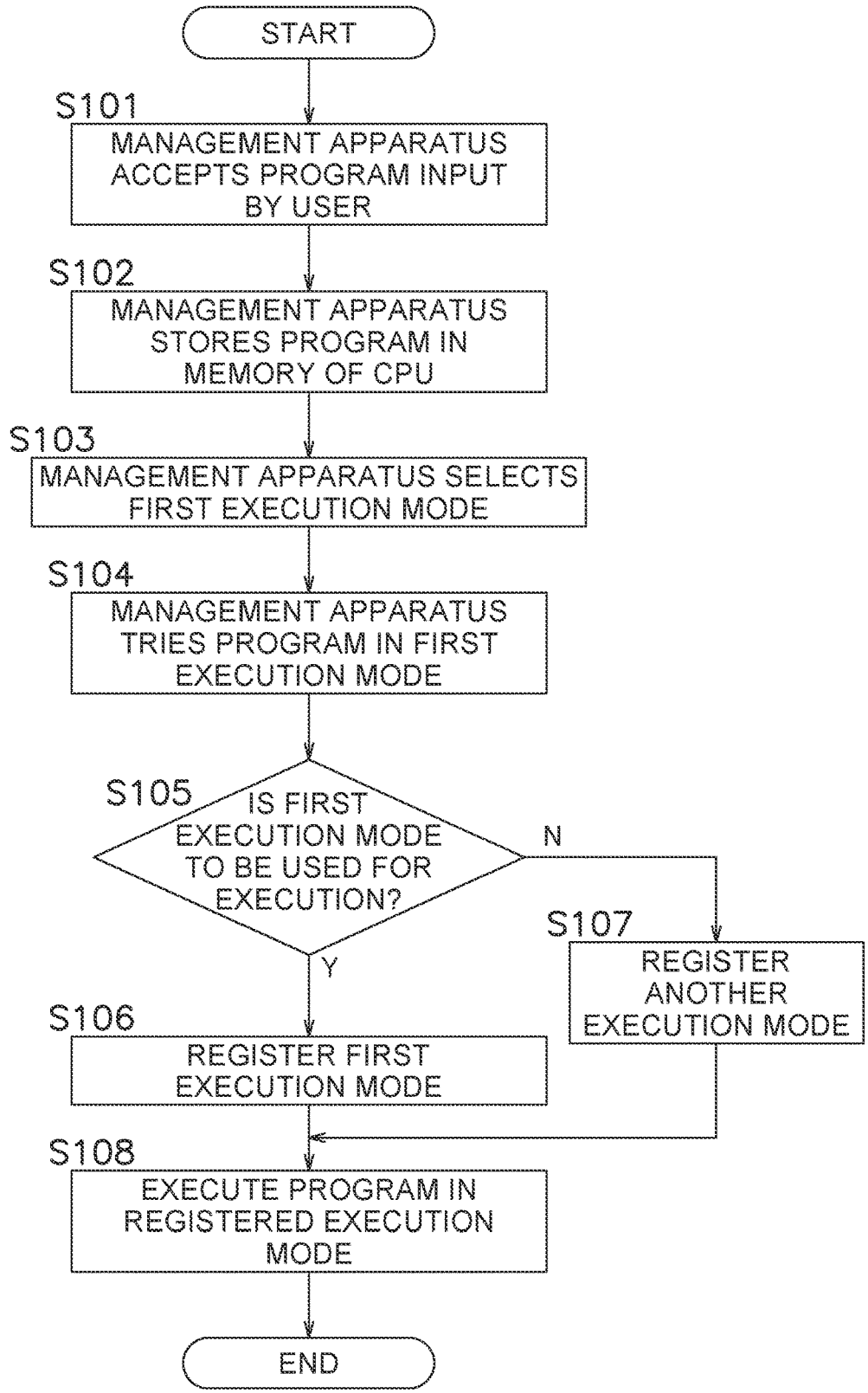
FIG. 3 is a flowchart of a method for controlling a device of the first embodiment.

Next, control of the device 21 by the device control system 1 of the present embodiment will be described with reference to the flowchart in FIG. 3.

A user inputs, in the user terminal 41a or 41b, a program for controlling the device 21, a processing performance for a trial, and an execution condition. More specifically, the program is input in the form of a script. The processing performance includes the number of cores of the CPU, an operating frequency, and the number of memories of the CPU. The processing performance corresponds to one of the execution modes in accordance with the selection of the above. The execution condition includes a script maximum execution time and so on. The management apparatus 10 accepts the program input by the user (S101). The management apparatus 10 temporarily stores, in the memory in the CPU 11, the accepted program, the processing performance (execution mode), and the execution condition (S102).

Subsequently, the management apparatus 10 selects an execution mode in accordance with the processing performance designated by the user (S103). It is assumed that the execution mode selected in this step is the first execution mode.

Subsequently, the management apparatus 10 tries (executes) the stored program in the first execution mode (S104).

The management apparatus 10 monitors an execution state while executing the program. The target to be monitored includes an execution time of the program, a CPU usage rate, and a memory usage rate.

In step S105, the management apparatus 10 determines an execution mode on the basis of the execution state of the trial of the program. In other words, the management apparatus 10 determines whether to select the tried first execution mode or to select another execution mode.

The determination in step S105 is made in accordance with the execution state of the program executed in the first execution mode. For example, the determination is made in accordance with the execution time. If the execution time is shorter than or equal to a predetermined time, the first execution mode is selected. If the execution time is longer than the predetermined time, the second execution mode, which has a higher processing performance than the first execution mode, is selected.

If the first execution mode is selected, the process proceeds to step S106, where the program and the first execution mode are registered and stored in the storage unit 12.

If the first execution mode is not selected and it is determined to select another execution mode in step S105, the process proceeds to step S107, where the program and the selected execution mode (for example, the second execution mode) are registered in the storage unit 12.

After step S106 or step S107, the process proceeds to step S108, where the management apparatus 10 calls the program registered in the storage unit 12 and the execution mode of the program, and executes the program in the execution mode to control the device 21.

(4) Features of First Embodiment 4-1

The device control system 1 of the first embodiment includes the device 21 and the management apparatus 10 connected to the device 21 via the network. The management apparatus 10 includes the CPU 11 and the storage unit 12. The management apparatus 10 accepts a program for controlling the device 21 input by a user (S101). The management apparatus 10 has a plurality of execution modes for executing the program for controlling the device 21.

The management apparatus 10 tries the accepted program in one selected execution mode (first execution mode) (S104). The management apparatus 10 determines, on the basis of a trial result, whether execution of the program in the first execution mode is appropriate or not (S105). If it is determined that execution in the first execution mode is appropriate, the management apparatus 10 registers the first execution mode together with the program in the storage unit 12 (S106). The management apparatus 10 executes the registered program in the registered execution mode to control the device 21 (S108).

The management apparatus 10 that performs remote control is capable of controlling a plurality of devices via a network. Thus, a user may input a program (script) for performing complex control, for example, simultaneously controlling a plurality of devices. The device control system 1 of the first embodiment has a plurality of execution modes for a control program and is thus capable of selecting and executing an appropriate execution mode in accordance with the complexity, cost, and so forth of the program.

Some users of the device control system 1 may be unfamiliar with an execution environment parameter (a processing performance, an execution condition, and so forth) required for executing the program. In the present embodiment, the control program is tried in one execution mode and an appropriate execution mode is determined. Thus, even if a user designates an inappropriate execution mode, device control can be eventually performed in an appropriate execution mode.

4-2

In the device control system 1 of the first embodiment, the management apparatus 10 accepts input of a program together with input of an execution condition of the program (S101). The execution condition is, for example, a condition that the execution time of the program is shorter than or equal to a predetermined time. Subsequently, a trial of the program is performed (S104). When determining that a trial result of the program does not satisfy the execution condition, the management apparatus 10 decides to execute the program in the second execution mode, which has a higher processing performance than the first execution mode (S105).

The device control system 1 of the first embodiment accepts input of an execution condition from a user and determines, on the basis of a result of a trial (S104), an execution mode so as to satisfy the execution condition (S105). Thus, control specifications satisfying a desire of the user can be achieved.

4-3

In the device control system 1 of the first embodiment, the management apparatus 10 tries a program and then registers a determined execution mode in the storage unit 12.

The device control system 1 of the first embodiment performs a trial before registering a control program and an execution mode, and is thus capable of registering a more appropriate execution mode.

(5) Modification Examples (5-1) Modification Example 1A

Figure 2:
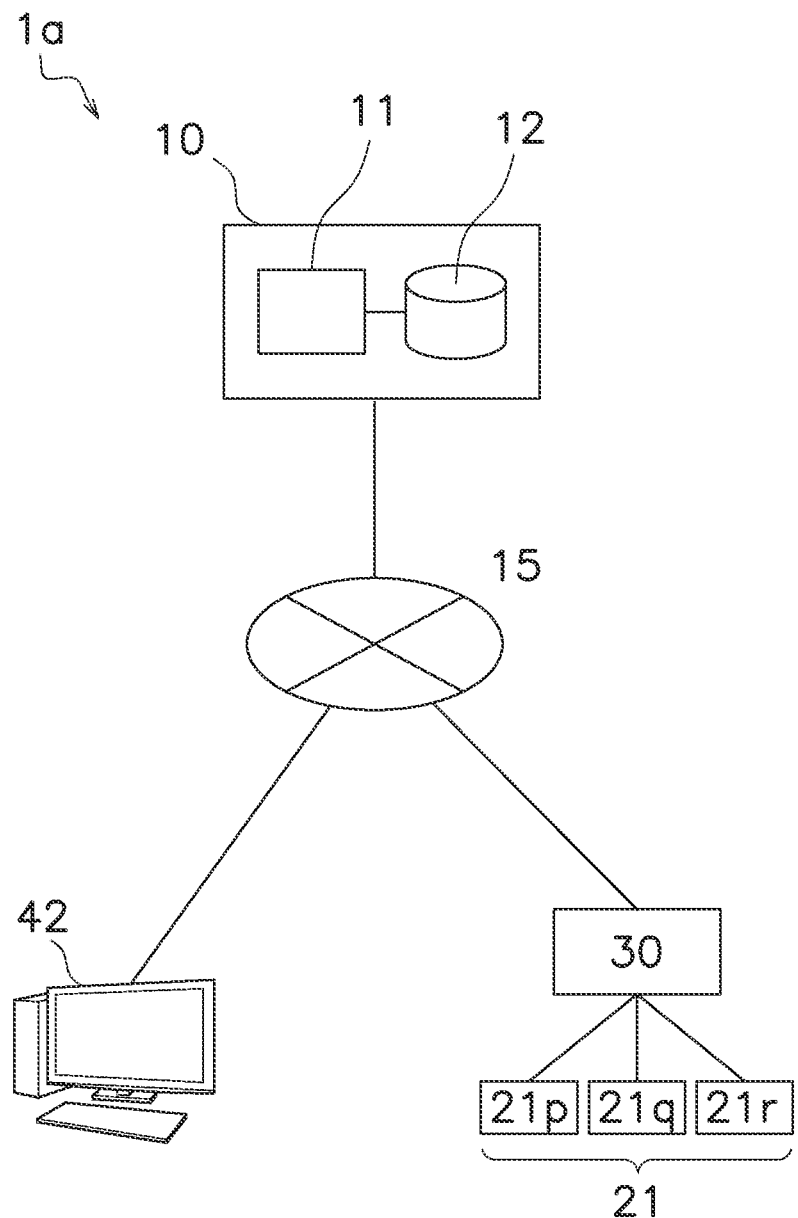
FIG. 2 is a diagram illustrating an overall configuration of a device control system 1a of Modification Example 1.

A device control system 1a of Modification Example 1A includes a management apparatus 10, a control apparatus 30, a device 21, and a user terminal 42, as illustrated in FIG. 2. The functions of the management apparatus 10, the device 21, and the user terminal 42 are almost the same as in the first embodiment. The device control system 1a of Modification Example 1A further includes the control apparatus 30. The control apparatus 30 is connected to individual devices 21p to 21r. The control apparatus 30 is connected to the management apparatus 10 through a communication line via a network 15. In other words, in Modification Example 1A, the individual devices 21p to 21r are connected to the network 15 and the management apparatus 10 via the control apparatus 30.

In Modification Example 1A, when the management apparatus 10 executes a control program for the device 21, a control instruction is transmitted to the control apparatus 30. The control apparatus 30 controls the device 21 in accordance with the control instruction.

In Modification Example 1A, a user is a manager of a building, for example. The user controls the devices 21p to 21r in the entire building. The user terminal 42 may be a personal computer. The control apparatus 30 controls the individual devices 21p to 21r.

(5-2) Modification Example 1B

In the first embodiment, a user simultaneously inputs a processing performance (execution mode) and an execution condition when inputting a program. The user may input a program (script) and may not input a processing performance (execution mode) or an execution condition.

In Modification Example 1B, the user does not input a processing performance (execution mode) in advance. In step S103, the management apparatus 10 selects an execution mode for trying a program on the basis of the program input by the user. Other than that, the configuration of Modification Example 1B is similar to that of the first execution mode.

(5-3) Modification Example 1C

In the first embodiment, a program (script), a processing performance (execution mode), and an execution condition input by a user are accepted by the management apparatus 10 and are temporarily stored in the memory of the CPU (S102). At this time, the program may be registered in the storage unit 12.

In Modification Example 1C, the accepted program is registered in the storage unit 12 in step S102. In Modification Example 1C. when an execution mode is registered in step S106 or S107, the execution mode is registered in the storage unit 12 in association with the already registered program.

(5-4) Modification Example 1D

In the first embodiment, the management apparatus 10 tries a control program in the first execution mode (S104), and determines the execution mode to be implemented on the basis of a result of the trial (S105). The trial may be performed twice, or three times or more. Alternatively, the program may be tried not only in the first execution mode but also in another execution mode.

In Modification Example 1D, it is determined in step S105 whether a trial result satisfies an execution condition input by a user. The execution condition is, for example, whether the execution time of the program is shorter than or equal to a predetermined time. If the execution time is shorter than or equal to the predetermined time, it is determined that the execution condition is satisfied and that the program is to be executed in the first execution mode, and the first execution mode is registered in the storage unit 12 (S106). This case is similar to the first embodiment. If the trial in the first execution mode does not satisfy the execution condition in step S105, the same control program is tried again in another execution mode. The case where the execution condition is not satisfied is, for example, a case where a trial of the program in the first execution mode takes more than the predetermined time. In this case, the second execution mode, which has a higher processing performance than the first execution mode, is selected as another execution mode, and a trial is performed.

In Modification Example 1D, if the trial of the control program in the second execution mode does not satisfy the execution condition designated by the user, a trial of the program is further performed in a third execution mode. In this way, a trial of the program is repeated as long as there is an execution mode having a higher processing performance, until the execution condition designated by the user is satisfied. The number of execution modes is typically limited. Thus, the trial ends after the limited number of trials regardless of whether the execution condition designated by the user is satisfied.

In the device control method of Modification Example 1D, a trial may be repeated if necessary to approach a more appropriate execution mode.

(5-5) Modification Example 1E

In the first embodiment and Modification Examples 1A to 1D, the execution condition is whether the execution time of the program is shorter than or equal to a predetermined time. The execution condition is not limited thereto.

In Modification Example 1E, the execution condition is a CPU average usage rate. In step S105, it is determined whether a trial result is lower than or equal to a CPU average usage rate input by the user.

In Modification Example 1E, the execution condition is CPU average usage rate. Alternatively, the execution condition may be a program average execution time, a CPU maximum usage rate, a memory average usage rate, or a memory maximum usage rate.

(5-6) Modification Example 1F

In Modification Example 1D, a description has been given of the case of repeating a trial of a program until an execution condition designated by a user is satisfied. In Modification Example 1D, there is no limit on the number of trials of a program. An upper limit may be set for the number of trials of a program in advance.

In Modification Example 1F, a user sets an upper limit for the number of trials of a program. For example, in Modification Example 1F, the upper limit is three times. If an execution condition is not satisfied after three trials, the user is notified of the fact.

In Modification Example 1F, a limit is set for the number of trials. Alternatively, an upper limit may be set for a trial execution time instead of the number of trials. An upper limit may be set for both the number of trials and a trial execution time.

Second Embodiment (6) Device Control System 1 and Method for Controlling Device 21 of Second Embodiment In the device control system 1 of the first embodiment, the management apparatus 10 tries a device control program input by a user in the first execution mode, and the management apparatus 10 determines whether to select the first execution mode. In the device control system 1 of a second embodiment, the same process as that in the first embodiment is performed until a program is tried in the first execution mode. In the device control system 1 of the second embodiment, the management apparatus 10 inquires of a user which execution mode is to be used to execute a program after trying the program in the first execution mode, and the user determines which execution mode is to be selected.

Figure 4:
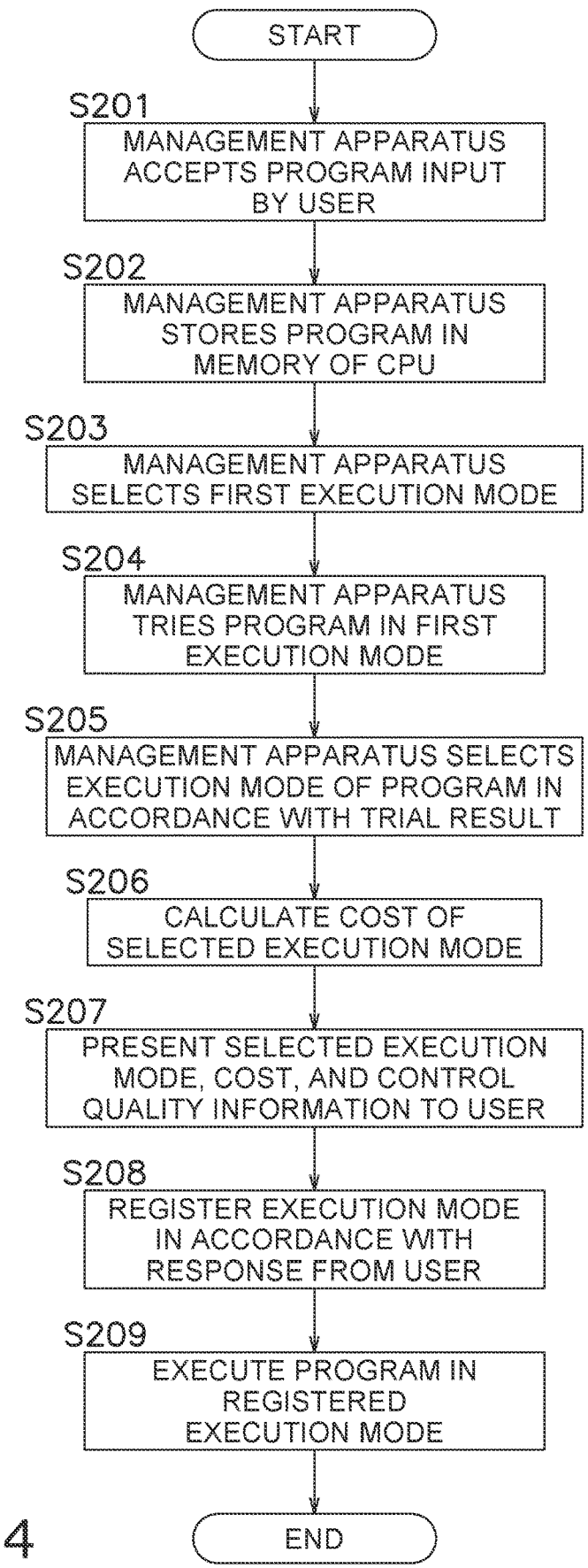
FIG. 4 is a flowchart of a method for controlling a device of a second embodiment.

The configuration of the device control system 1 of the second embodiment is the same as that of the device control system 1 of the first embodiment in FIG. 1. A method for controlling the device 21 using the device control system 1 of the second embodiment will be described with reference to the flowchart in FIG. 4.

In the method for controlling the device of the second embodiment, the stage up to the trial of a program in steps S201 to S204 is totally the same as steps S101 to S104 of the first embodiment.

In the second embodiment, after trying the program in step S204, the management apparatus 10 selects an appropriate execution mode on the basis of an execution state at the trial in the first execution mode (S205). Subsequently, the management apparatus 10 calculates the cost of the execution mode (S206). The appropriate execution mode may be the first execution mode or may be another execution mode. The appropriate execution mode may be one execution mode or may be a plurality of execution modes. In the present embodiment, if the execution state does not have any problems, the first execution mode is selected as an appropriate execution mode. If the management apparatus 10 determines that the execution state has a problem, an execution mode having a higher processing performance is selected as an appropriate execution mode.

Subsequently, the management apparatus 10 presents the execution mode for which the cost has been calculated, the cost, and control quality information to the user (S207). A set of the execution mode, the cost, and the control quality information presented here may be one set, or may be two or more sets. Specifically, the execution mode, the cost, and the control quality information are transmitted to the user terminal 42 and are displayed on a display unit of the user terminal 42.

The control quality information indicates a margin of processing in the system in a case where the program is executed in the selected execution mode. The control quality information includes a processing execution time, a CPU average/maximum usage rate, a memory average/maximum usage rate, and so forth. The CPU herein is the CPU 11 of the management apparatus 10, and the memory herein is the memory in the CPU 11.

The processing execution time includes a processing time of the management apparatus 10 and a response time of the device 21 connected via the network 15. Furthermore, the response time of the device 21 includes a connection response time of the network 15 and a processing time of the device 21. The connection response time of the network 15 greatly varies according to a network connection environment. The network connection environment includes, for example, a communication scheme such as 5G, LTE, or 3G.

A presentation example of control quality information and so forth presented to the user by the management apparatus in step S207 is illustrated in FIG. 5. In FIG. 5, the determined execution mode, the cost, and the control quality information are displayed. All of them need not necessarily be displayed. For example, the determined execution mode and the cost may be displayed, or the determined execution mode and the control quality information may be displayed. Here, the first execution mode is displayed as a determined execution mode. This means that the first execution mode is selected in step S205. In the second row in FIG. 5, the cost calculated in step S206 is displayed. In FIG. 5, the control quality information obtained through the trial (execution) in step S204 is displayed in the third row and the following rows. Here, an execution time of the program, an execution condition (predetermined value) input by the user with respect to the execution time of the program, a processing time of the management apparatus, a response time of the device, and a CPU average usage rate are displayed as the control quality information.

The control quality information presents, to the user, a quantitative degree of an actual value relative to an execution condition even if the execution condition is satisfied, thereby assisting the user in selecting an execution mode. A specific example of control quality information further includes the following. It is assumed that a CPU average usage rate as an execution condition in execution of the program is set to 70% or less. It is assumed that an actual value in a trial of the program is 68%. The user can recognize that the execution condition is satisfied but there is a narrow margin. The user is able to make a comprehensive determination on selection of an execution mode in consideration of a result of other parameters.

After the execution mode, the cost, and the control quality information have been presented, the user selects an execution mode on the basis of the presented cost and control quality information. The execution mode selected by the user is input to the user terminal 42 and is transmitted to the management apparatus 10 via the network. The management apparatus 10 registers a response from the user, in other words, the execution mode selected by the user, in the storage unit 12 (S208).

The management apparatus 10 executes the program in the registered execution mode to control the device 21 (S209).

(7) Feature of Second Embodiment 7-1

In the device control system 1 of the second embodiment, after a program has been tried in the first execution mode, a user is inquired about the execution mode to be used to execute the program, and the execution mode to be selected is determined.

When inquiring of the user about an execution mode, the device control system 1 presents, to the user, a single execution mode or a plurality of execution modes, the cost thereof, and the control quality information thereof. The user selects an execution mode on the basis of the cost and the control quality information. The management apparatus selects an execution mode in accordance with the selection made by the user.

In the device control system 1 of the second embodiment, the management apparatus 10 presents an execution mode, cost, and control quality information to a user. Thus, the user is able to select an optimum execution mode in consideration of the cost and the control quality information.

(8) Modification Examples (8-1) Modification Example 2A

In the second embodiment, a description has been given of a case in which, in step S207, a selected execution mode, cost, and control quality information are always presented to a user. The execution mode and so forth may be presented to the user only in a case where a mode other than the first execution mode is selected in step S205.

More specifically, in Modification Example 2A, as in the second embodiment, an execution state is monitored while a program is being tried in the first execution mode in step S204. As a result, if the execution of the program in the first execution mode does not have any problems, the management apparatus 10 selects the first execution mode. Here, "does not have any problems" means, for example, a case where the execution time of the program is shorter than or equal to a predetermined time.

If the management apparatus 10 selects only the first execution mode in step S205, calculation of the cost is not performed in step S206. Presentation of the execution mode and so forth to the user is not performed in step S207. The management apparatus 10 registers the first execution mode in the storage unit 12 instead of performing step S208.

On the other hand, if an execution mode other than the first execution mode is selected in step S205, the process proceeds to steps S206 to S208 and the execution mode selected by the user is registered as in the second embodiment.

Other than that, the configuration of Modification Example 2A is similar to that of the second embodiment.

(8-2) Modification Example 2B

In the second embodiment, the management apparatus 10 executes (tries, S204) a control program in the first execution mode, and determines an execution mode to be implemented on the basis of a result of the execution (trial)(S205). The execution (trial) may be performed twice, or three times or more. Alternatively, the program may be executed (tried) in another execution mode as well as in the first execution mode.

In Modification Example 2B, it is determined, after step S204, whether a result of the execution (trial) satisfies an execution condition input by a user. The execution condition is, for example, whether the execution time of the program is shorter than or equal to a predetermined value. If the execution time is shorter than or equal to the predetermined value, it is determined that the execution condition is satisfied and that the program is to be executed in the first execution mode (S205). This case is similar to the second embodiment. If the execution (trial) in the first execution mode does not satisfy the execution condition, the same control program is executed again in another execution mode. The case where the execution condition is not satisfied is, for example, a case where the execution of the program in the first execution mode exceeds the predetermined value. In this case, the second execution mode, which has a higher processing performance than the first execution mode, is selected and implemented as another execution mode.

In Modification Example 2B, if the execution of the control program in the second execution mode does not satisfy the execution condition designated by the user, the program is further executed (tried) in the third execution mode. In this way, execution of the program is repeated until the execution condition designated by the user is satisfied, as long as there is an execution mode having a higher processing performance. The number of execution modes is typically limited. Thus, execution as a trial ends after the limited number of executions regardless of whether the execution condition designated by the user is satisfied.

In Modification Example 2B, the management apparatus selects an execution mode of the program through the above-described process (step S205). Step S206 and the following steps are the same as in the second embodiment.

An example of the execution mode, cost, and control quality information presented to the user in step S207 in Modification Example 2B is illustrated in FIG. 6.

In FIG. 6, "third execution mode" is displayed as a "determined execution mode", which indicates that the execution condition is satisfied in the third execution (trial). The usage cost and control quality information when the third execution mode is selected are simultaneously presented.

Third Embodiment (9) Device Control System 1 and Method for Controlling Device 21 of Third Embodiment The device control system 1 of a third embodiment includes a device 21 and a management apparatus 10 connected to the device 21 via a network 15, as in the first and second embodiments.

Figure 7A:
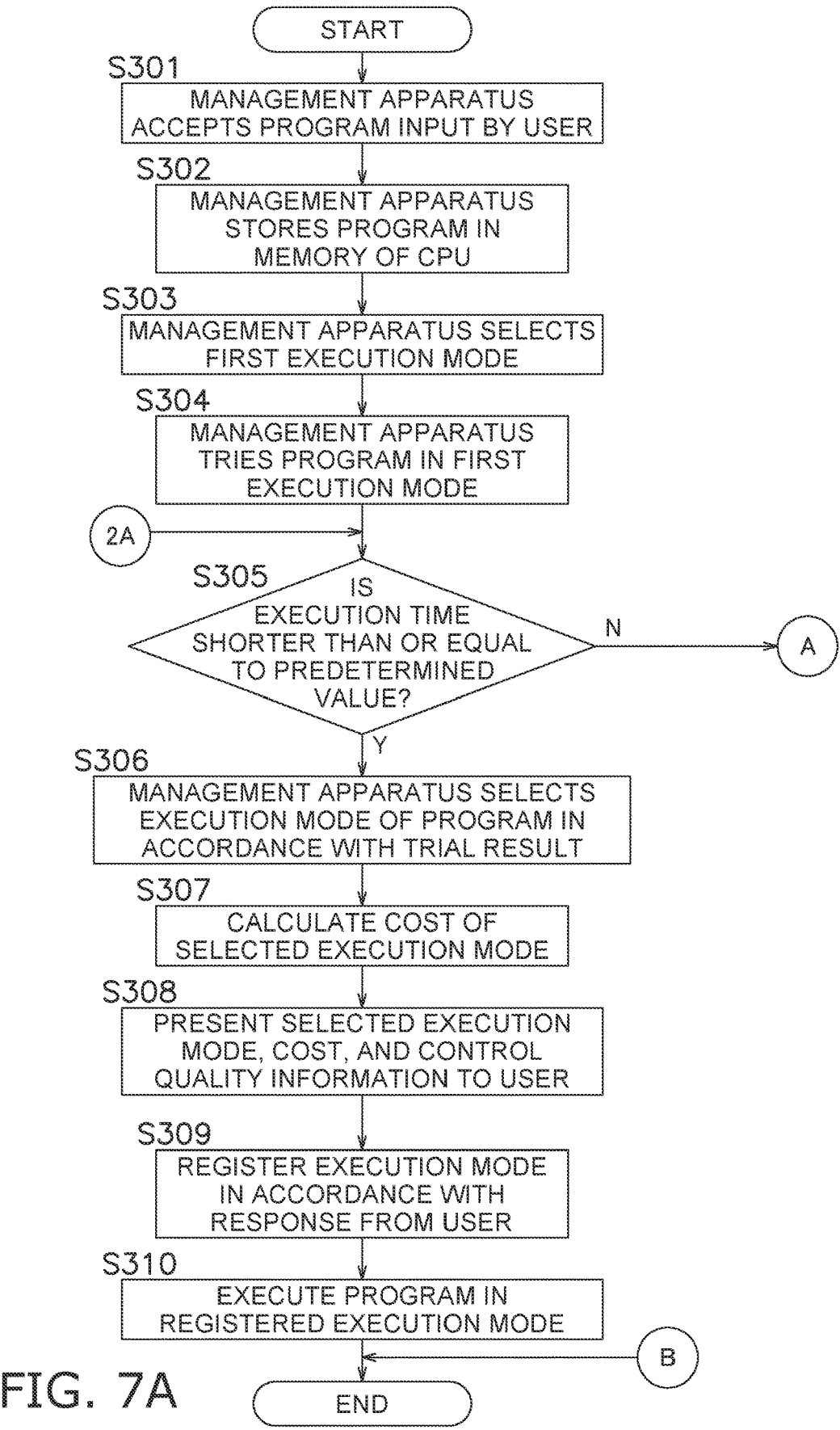
FIG. 7A is part of a flowchart of a method for controlling a device of a third embodiment.
Figure 7B:
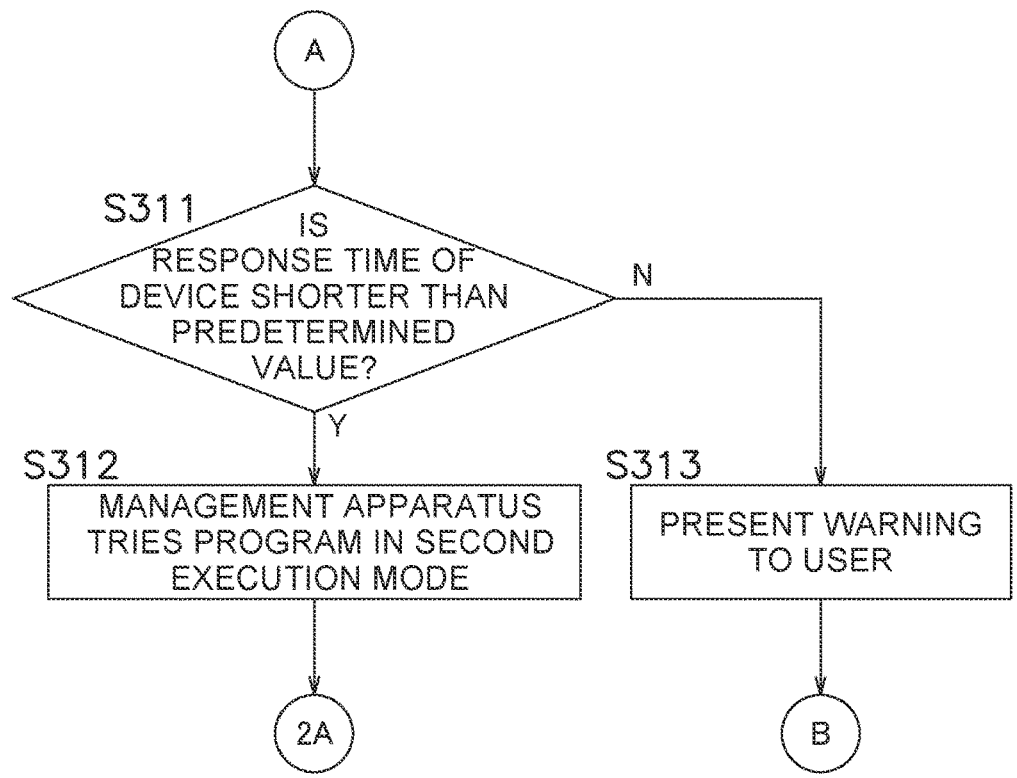
FIG. 7B is part of the flowchart of the method for controlling a device of the third embodiment.

A method for controlling the device 21 of the third embodiment will be described with reference to the flowchart in FIGS. 7A and 7B. Steps S301 to S304 of the third embodiment are the same as steps S201 to S204 of the second embodiment.

In the third embodiment, it is determined in step S305 whether a result of the execution (trial) of a program in the first execution mode in step S304 satisfies an execution condition designated by a user. Specifically, it is determined whether an execution time in the first execution mode satisfies an execution condition of being shorter than a predetermined value. In the program for this control, the predetermined value of the execution time is a target value which is a desired maximum execution time. The predetermined value may be input by the user together with the program, or the management apparatus 10 may set an appropriate value as the predetermined value.

If the execution time is shorter than the predetermined value in step S305, the first execution mode is selected in step S306, and the process proceeds to steps S307 to S310. Steps S306 to S310 of the third embodiment are the same as steps S205 to S209 of the second embodiment.

If the execution time is longer than or equal to the predetermined value in step S305, the process proceeds to step S311.

In step S311, it is determined whether, of the execution time during which the program is executed (tried) in the first execution mode, a response time of the device exceeds a predetermined value. The predetermined value used in step S311 may be the same as or different from the predetermined value used in step S305.

If the response time of the device is shorter than the predetermined value in step S311, it indicates that the total execution time can be reduced below the predetermined value by shortening the response time of the management apparatus. In this case, the management apparatus 10 executes the program in the second execution mode, which has a higher processing performance than the first execution mode (S312). After step S312, the process returns to step S305, and condition determination is repeated.

If the response time of the device is longer than or equal to the predetermined value in step S311, a warning and the response time of the device are presented to the user (S313). If the response time of the device is longer than or equal to the predetermined value, the management apparatus may give a warning to the user and also determine an execution mode in which the program is to be executed.

Figure 8:
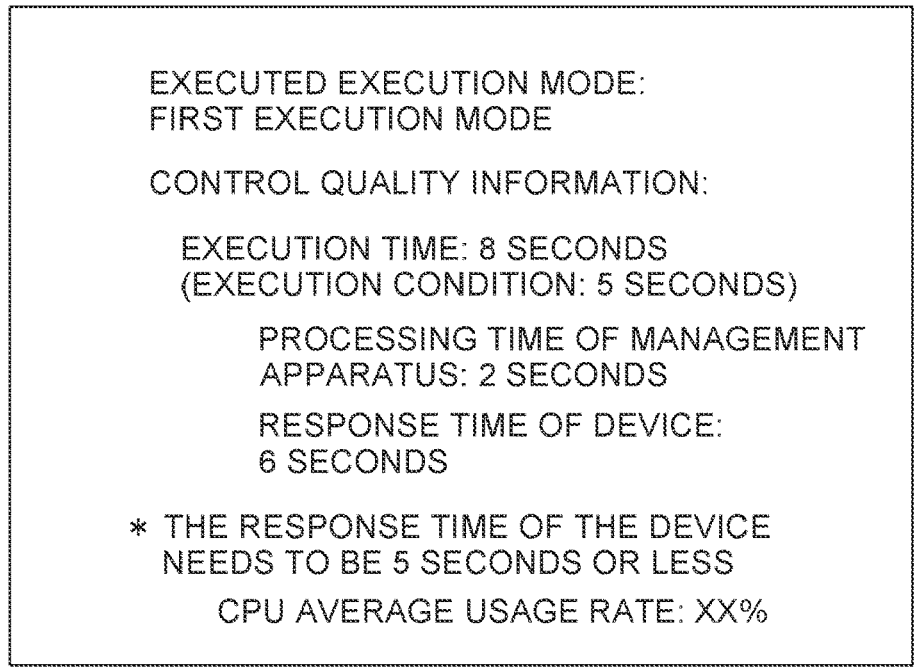
FIG. 8 illustrates a display example of a screen presented to a user in the method for controlling a device of the third embodiment.

An example of a display screen presented to the user in step S313 is illustrated in FIG. 8. In FIG. 8, an executed execution mode, control quality information, and warning information to the user are displayed. The executed (tried) execution mode is the first execution mode. The control quality information includes an execution time when the program is executed in the first execution mode, an execution condition (predetermined value) input by the user with respect to the execution time of the program, a processing time of the management apparatus 10, a response time of the device 21, and a CPU average usage rate. In addition, a warning to the user "the response time of the device needs to be 5 seconds or less" is displayed under the response time of the device. In step S313, either one of the warning and the response time of the device may be displayed.

The execution time of the program is the sum of the processing time of the management apparatus 10 and the response time of the device 21 connected via the network. If the response time of the device exceeds the predetermined value, it is not possible to sufficiently shorten the execution time even if the management apparatus 10 selects an execution mode having a high processing performance.

Furthermore, the response time of the device includes a network connection response time and a processing time of the device. If the response time of the device exceeds the predetermined value, the network connection response time is long in many cases. The user needs to cope with an improvement of the network (communication environment) separately from an improvement of the management apparatus 10 or the device 21. Thus, the system 1 gives a warning to the user and prompts the user to improve the communication environment.

The embodiments of the present disclosure have been described above. It is to be understood that the embodiments and the details can be variously changed without deviating from the gist and scope of the present disclosure described in the claims.

What is claimed is:

1. A device control system configured to remotely control one or more devices, the device control system comprising:
    the one or more devices; and
    a management apparatus connected to the one or more devices via a network, the management apparatus being capable of executing, in a plurality of execution modes having different processing performances, a program in order to control the one or more devices, and
    the management apparatus being configured to
        accept input of the program,
        accept input of an execution condition of the program when accepting the input of the program,
        execute the program in a first execution mode, which is one of the plurality of execution modes, and
        determine, based on an execution result, an execution mode in which the program is to be executed,
        decide to execute the program in a second execution mode having a higher processing performance than the first execution mode upon determining that the execution result of the program does not satisfy the execution condition.

2. The device control system according to claim 1, wherein
    the management apparatus includes a CPU and a storage unit, and
    the management apparatus is further configured to register the accepted program and the determined execution mode in the storage unit, and execute the program registered in the storage unit in the registered execution mode to control the one or more devices.

3. The device control system according to claim 2, wherein the CPU includes a core and a memory, and the processing performance of each of the plurality of execution modes includes an operating frequency of the CPU, the number of cores of the CPU, and the number of memories of the CPU.

4. The device control system according to claim 2, wherein the execution result of the program includes an execution time of the program, and the execution time of the program is a sum of a processing time of the management apparatus and a response time of the one or more devices connected via the network.

5. The device control system according to claim 2, wherein the system is configured to present to a user, after the execution in the first execution mode, the determined execution mode of the program, and control one or both of quality information and cost when the execution mode of the program is selected.

6. The device control system according to claim 2, wherein an execution time of the execution of the program in the first execution mode is a sum of a processing time of the management apparatus and a response time of the one or more devices connected via the network, and the device control system is configured to provide a warning to a user if the response time of the one or more devices exceeds a predetermined value.

7. The device control system according to claim 2, further comprising:

a control apparatus connected to the one or more devices, the control apparatus being connected to the management apparatus via the network, and the one or more devices being controlled via the control apparatus.

8. The device control system according to claim 1, wherein the execution result of the program includes an execution time of the program, and the execution time of the program is a sum of a processing time of the management apparatus and a response time of the one or more devices connected via the network.

9. The device control system according to claim 1, wherein an execution time of the execution of the program in the first execution mode is a sum of a processing time of the management apparatus and a response time of the one or more devices connected via the network, and the device control system is configured to provide a warning to a user if the response time of the one or more devices exceeds a predetermined value.

10. The device control system according to claim 1, further comprising:

a control apparatus connected to the one or more devices, the control apparatus being connected to the management apparatus via the network, and the one or more devices being controlled via the control apparatus.

11. A device control system configured to remotely control one or more devices, the device control system comprising: the one or more devices; and a management apparatus connected to the one or more devices via a network, the management apparatus being capable of executing, in a plurality of execution modes having different processing performances, a program in order to control the one or more devices, and the management apparatus being configured to accept input of the program, execute the program in a first execution mode, which is one of the plurality of execution modes, and determine, based on an execution result, an execution mode in which the program is to be executed, the device control system being further configured to present to a user, after the execution in the first execution mode, the determined execution mode of the program, and control one or both of quality information and cost when the execution mode of the program is selected.

12. The device control system according to claim 11, wherein the control quality information includes at least one of an execution time of the program, one or both of a CPU average usage rate and a CPU maximum usage rate, and one or both of a memory average usage rate and a memory maximum usage rate.

13. A method of controlling a device, the method comprising: using a management apparatus that includes a processor to execute a program to control the device, the management apparatus being connected to the device via a network, the management apparatus being capable of executing the program in a plurality of execution modes having different processing performances, the method including using the management device to accomplish: accepting input of the program; accepting input of an execution condition of the program when accepting the input of the program; executing the program in a first execution mode, which is one of the plurality of execution modes; determining, based on an execution result, an execution mode in which the program is to be executed; and executing the program in a second execution mode having a higher processing performance than the first execution mode upon determining that the execution result of the program does not satisfy the execution condition.

* * * * *